(12) United States Patent
Yang (10) Patent No.: US 6,702,479 B2
(45) Date of Patent: Mar. 9, 2004

(54) OPTICAL FIBER CONNECTOR ASSEMBLED BEFORE GRINDING

(75) Inventor: Jyh-Cherng Yang, Hsinchu (TW)

(73) Assignee: U-Conn Technology Inc., Hsinchu (TW)

( * ) Notice: Subject to any disclaimer, the term of this patent is extended or adjusted under 35 U.S.C. 154(b) by 0 days.

(21) Appl. No.: 09/976,772

(22) Filed: Oct. 12, 2001

(65) Prior Publication Data

US 2002/0110333 A1 Aug. 15, 2002

(30) Foreign Application Priority Data

Feb. 13, 2001 (TW) ........................... 90202158 U (51) Int. Cl.[7] ............................................... G02B 6/36
(52) U.S. Cl. ..................... 385/78; 385/60; 385/85
(58) Field of Search .................. 385/78, 60, 80, 385/85

(56) References Cited

U.S. PATENT DOCUMENTS

| | | | | |
|---|---|---|---|---|
| 6,146,024 A | * | 11/2000 | Melchior | 385/59 |
| 6,200,040 B1 | * | 3/2001 | Edwards et al. | 385/78 |
| 6,554,487 B2 | * | 4/2003 | Nolan | 385/78 |

* cited by examiner

Primary Examiner—Drew Dunn
Assistant Examiner—Leo Boutsikaris
(74) Attorney, Agent, or Firm—Troxell Law Office PLLC (57) ABSTRACT

An optical fiber connector includes a housing, a ferrule, two pins, a ferrule boot, a pin holder, a spring, a spring push, a sleeve and a boot assembled in series. The ferrule defines two through holes, and the pin holder defines two mounting holes aligned with the through holes, allowing the pins to be inserted through the through holes into the mounting holes.

3 Claims, 15 Drawing Sheets

OPTICAL FIBER CONNECTOR ASSEMBLED BEFORE GRINDING

BACKGROUND OF THE INVENTION

1. Field of the Invention

The present invention relates in general to an optical fiber connector which is assembled before being ground.

2. Description of the Related Art

Figure 1:
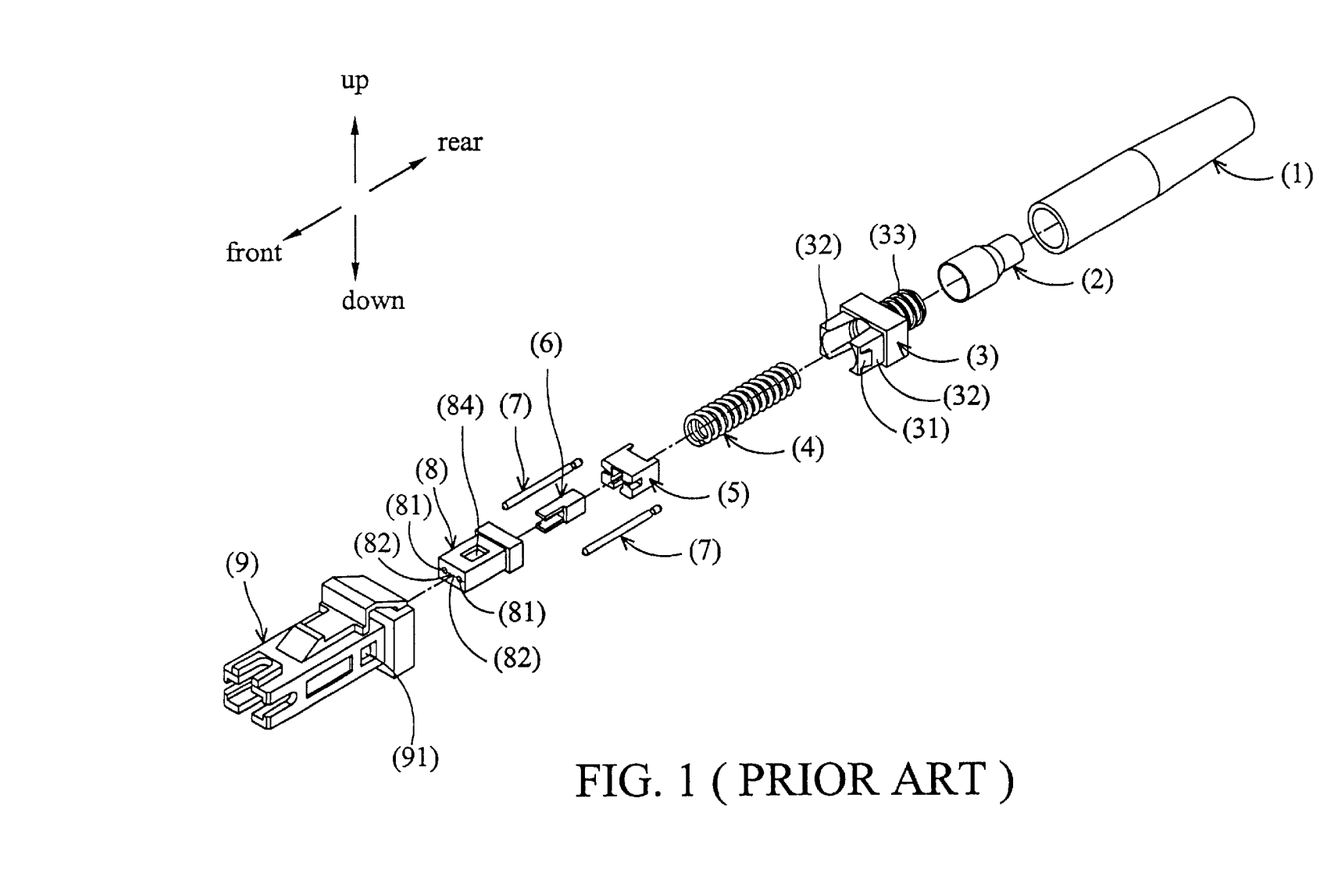
FIG. 1 is an exploded diagram of a conventional MT-RJ optical fiber connector.

Referring to FIG. 1, a conventional MT-RJ optical fiber connector has a boot (1), a sleeve (2), a spring push (3), a spring (4), a pin holder (5), a ferrule boot (6), a ferrule (8) and a housing (9). As well as these parts, a male MT-RJ optical fiber connector further uses two pins (7) but a female MT-RJ optical fiber connector does not. All of the parts are introduced as follows:

The housing (9) is hollow and is the outmost part of the MT-RJ optical fiber connector. The housing (9) defines two holes (91) on its both sides.

Figure 2:
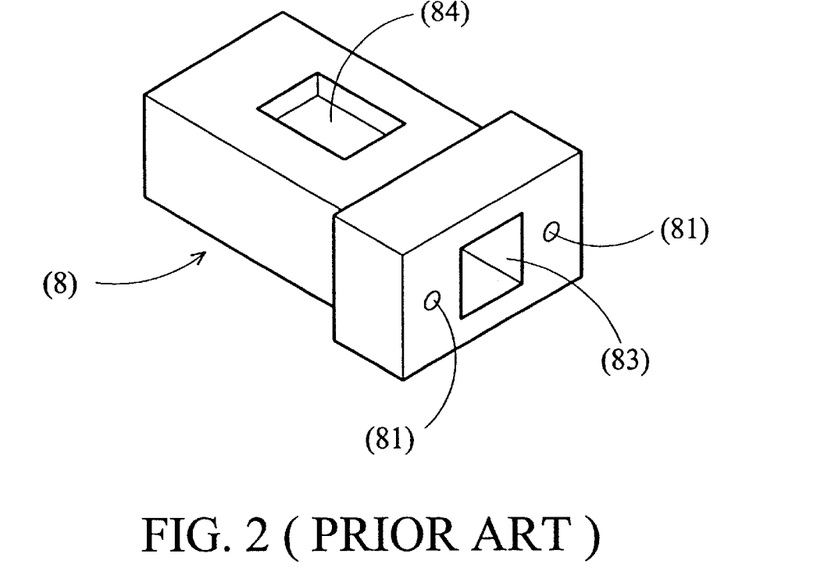
FIG. 2 is a perspective diagram of a ferrule of the conventional MT-RJ optical fiber connector.

The ferrule (8) is hollow and has a rectangular cross section. For easy description, the directions including up, down, front and rear are given in FIG. 1. The ferrule (8) defines two through holes (81) and two (four or more) fiber holes (82) on its front end surface. FIG. 2 is a perspective diagram of the ferrule, observed from the rear. The ferrule (8) further defines a tunnel (83) communicating with the fiber holes (82) on the front end surface. Beside the tunnel (83) are the through holes (81). The through holes (81) extend from the front end surface of the ferrule (8) to the rear end surface. Furthermore, the ferrule (8) defines a window (84) at its top surface. The window (84) communicates with the tunnel (83).

Figure 3:
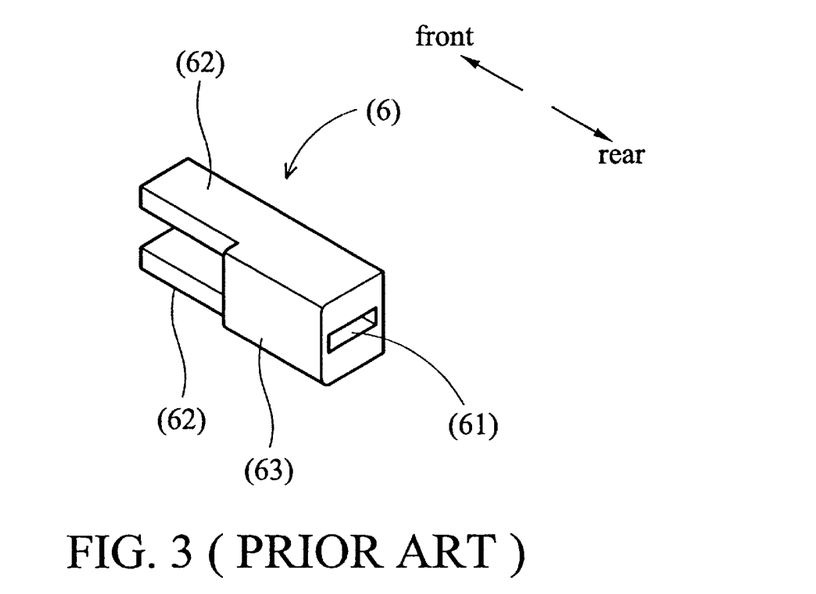
FIG. 3 is a perspective diagram of a ferrule boot of the conventional MT-RJ optical fiber connector.

Referring to FIG. 3, the ferrule boot (6) has a rectangular body (63). The body (63) defines a through hole (61) and has a pair of cantilevers (62) protruding from its front surface.

Figure 4:
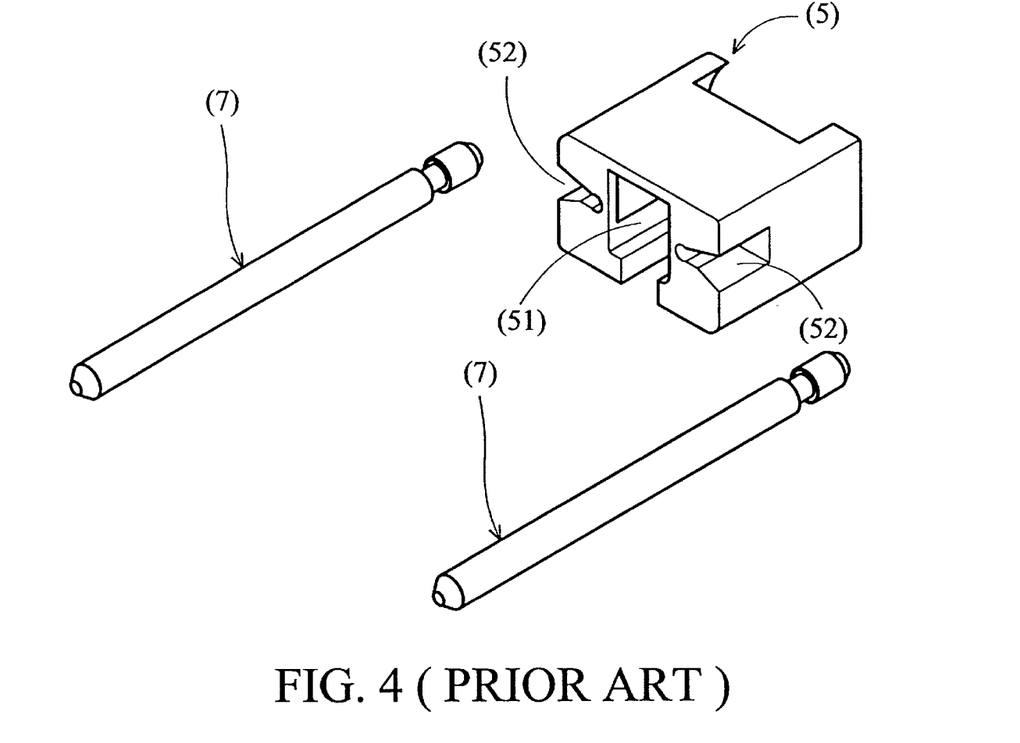
FIG. 4 depicts two pins and a pin holder of the conventional MT-RJ optical fiber connector.

Referring to FIG. 4, the pin holder (5) has a recess (51) on its bottom so that the pin holder (5) can sit on the ferrule boot (6) with the recess (51) containing the ferrule boot (6). The pin holder (5) defines two mounting holes (52) on both sides for containing the pins (7).

Referring back to FIG. 1, the spring (4) is a coiled spring.

The spring push (3) is constructed like a tube. However, the spring push (3) further has a pair of cantilevers (32) on its front end. Each cantilever (32) has an engaging portion (31). Furthermore, the rear end (33) of the spring push (3) is provided with threads.

The sleeve (2) has varying diameters. The front end of the sleeve (2) has a diameter greater than the rear end.

The boot (1) is constructed like a tube and is the rearmost part of the optical fiber connector.

Figure 5:
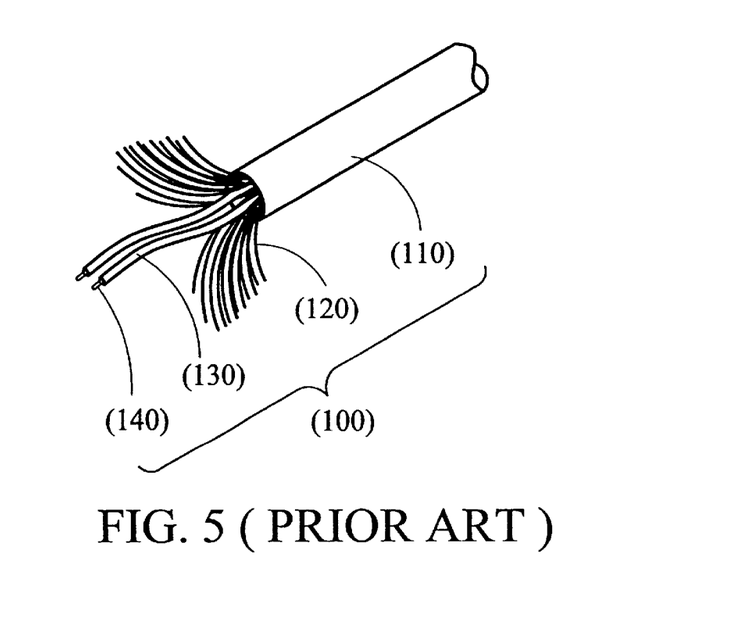
FIG. 5 depicts an optical fiber cable.

The optical fiber connector is mounted at an end of an optical fiber cable to connect a light source, a detector or another optical fiber cable. Referring to FIG. 5, the optical fiber cable (100) includes, from out to in, a plastic cover (110), celvars (120), a plurality of resin layers (130) and a plurality of optical fibers (140) respectively covered by the plurality of resin layers (130).

Figure 6A:
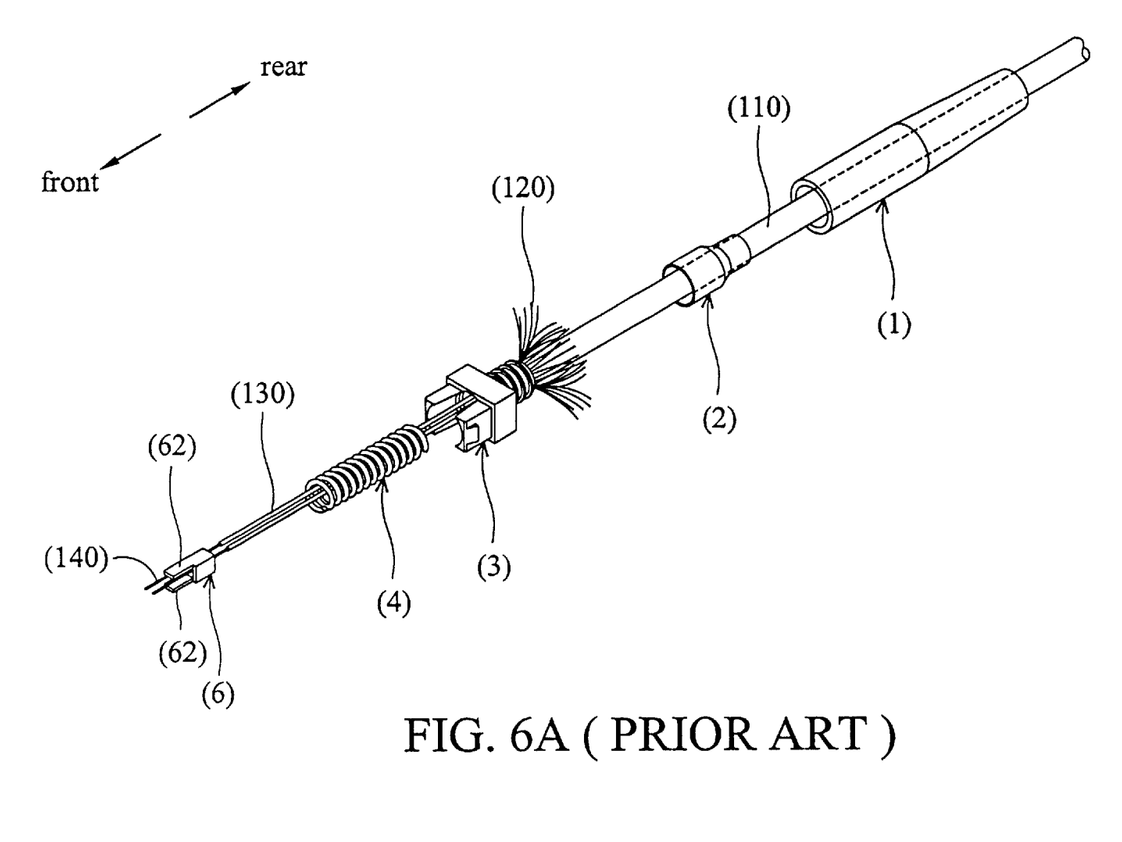
FIGS. 6A, 6B, 6C and 6D depict the process of assembling a conventional MT-RJ optical fiber connector.

A MT-RJ optical fiber connector and an optical fiber cable are assembled in accordance with the following process:

(Step 1) Referring to FIG. 6A, the boot (1) and the sleeve (2) are put around the plastic cover (110) of the optical fiber cable (100), without being fixed. An end of the optical fiber cable (100) is stripped to expose the celvars (120), resin layers (130) and optical fibers (140). Then, the spring push (3) and the spring (4) are put around the resin layers (130). Then, the spring push (3) is pushed backward to cover the plastic cover (110), with the celvars (120) held between the spring push (3) and the plastic cover (110). Thus, the spring push (3) is fixed to the optical fiber cable. Then, the optical fibers (140) are led through the through holes (61) of the ferrule boot (6), extending between the cantilevers (62).

Figure 6B:
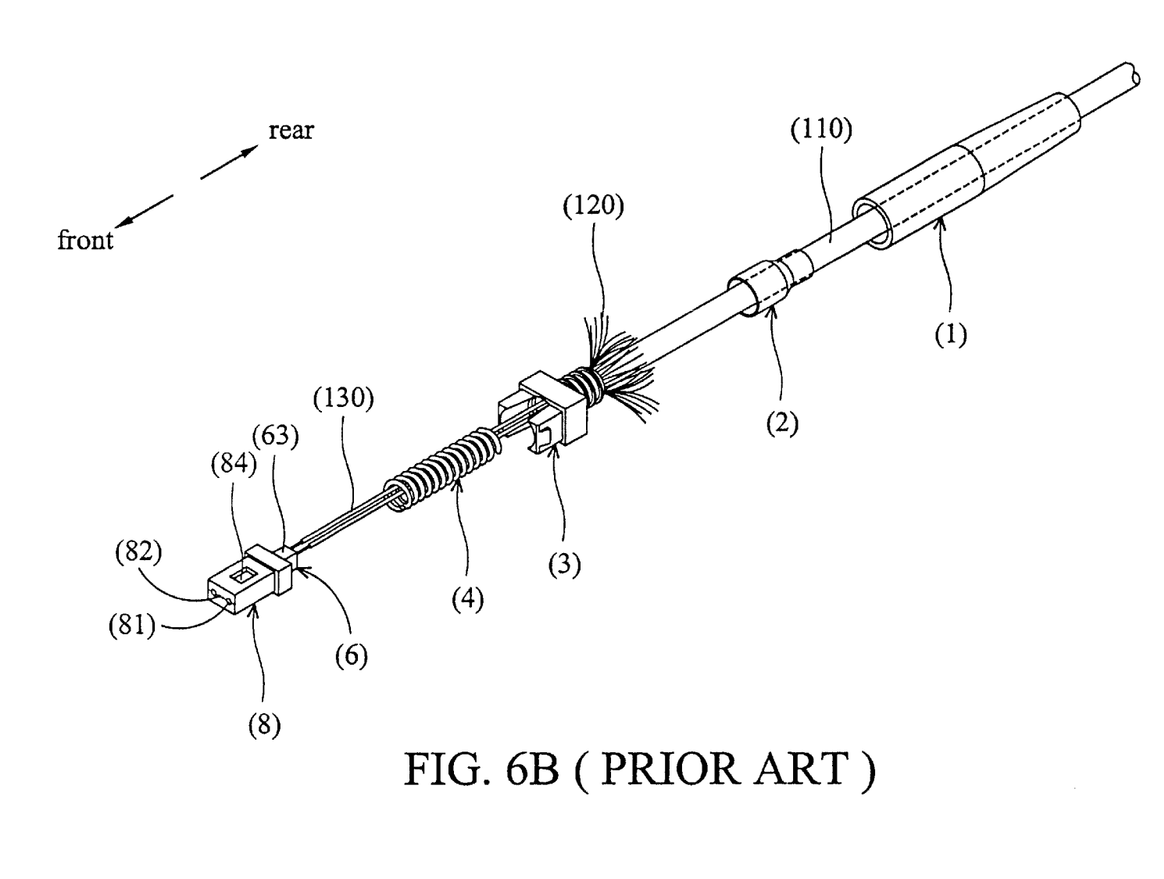

(Step 2) As shown in FIG. 6B, the cantilevers (62) of the ferrule boot (6) are inserted into the tunnel (83) of the ferrule (8), with the optical fibers (140) further into the fiber holes (82) communicating the tunnel (83). The optical fibers (140) protrude from the front end surface of the ferrule (8).

(Step 3) AB glue is applied to the inside of the ferrule (8) through the window (84). Then, the ferrule (8) is baked so that the AB glue is solidified to fix the optical fibers in the ferrule (8).

(Step 4) The front end surface of the ferrule (8) is ground to remove the portions of the optical fibers protruding therefrom.

Figure 6C:
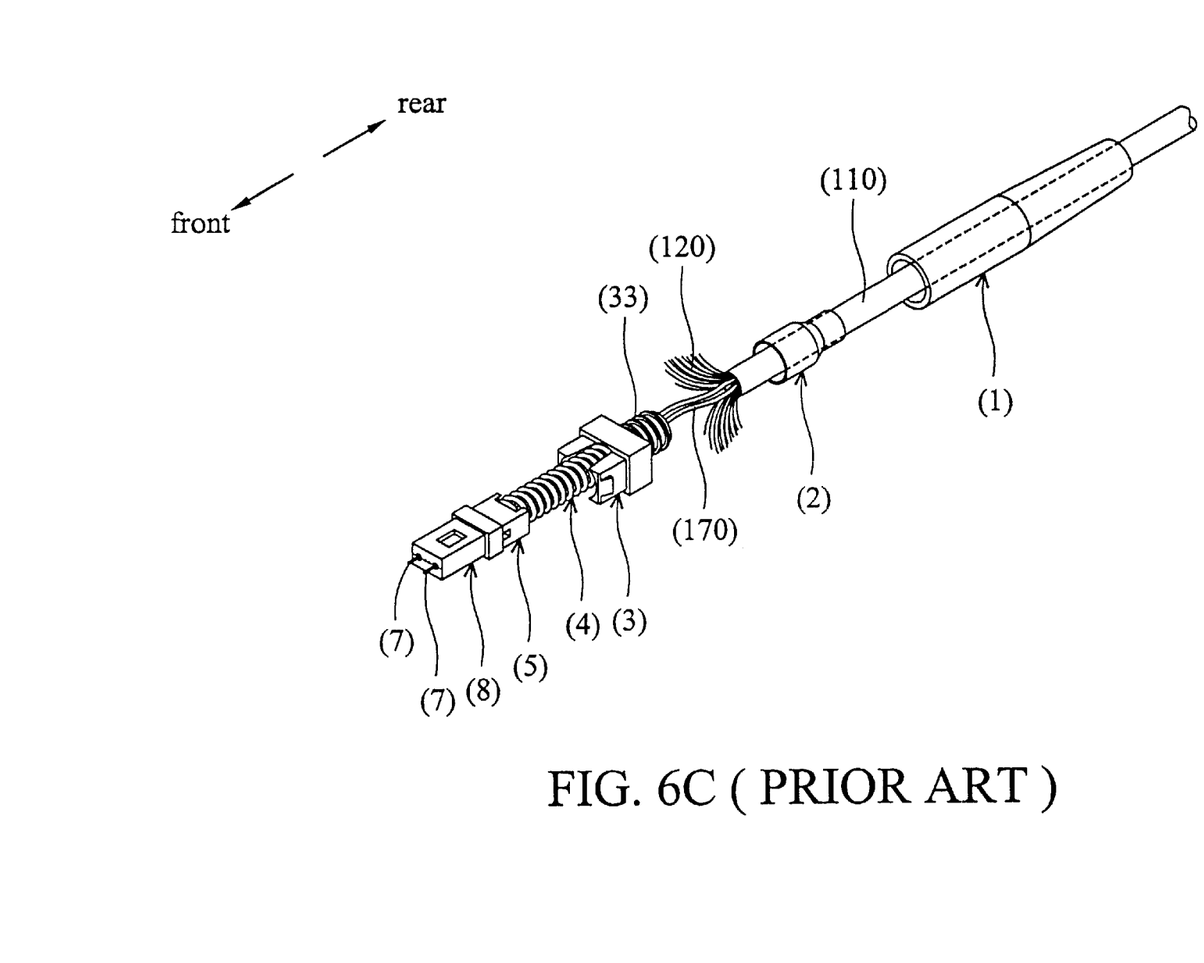

(Step 5) As mentioned above, a male connector has two pins (7) but a female connector has none. For the male connector, the rear ends of the pins (7) are fitted into the mounting holes (52) of the pin holder (5). Then, the pins (7) are inserted, towards the front, into the through holes (81) to protrude from the front end surface of the ferrule (8). Then, the pin holder (5) is mounted (sits) on the body (63) of the ferrule boot (6), with the spring (4) against the pin holder (5) and the spring push (3), as shown in FIG. 6C. The female connector has no pins. Therefore, the pin holder (5) is directly mounted (sits) on the body (63) of the ferrule boot (6), with the spring (4) against the pin holder (5) and the spring push (3).

Figure 6D:
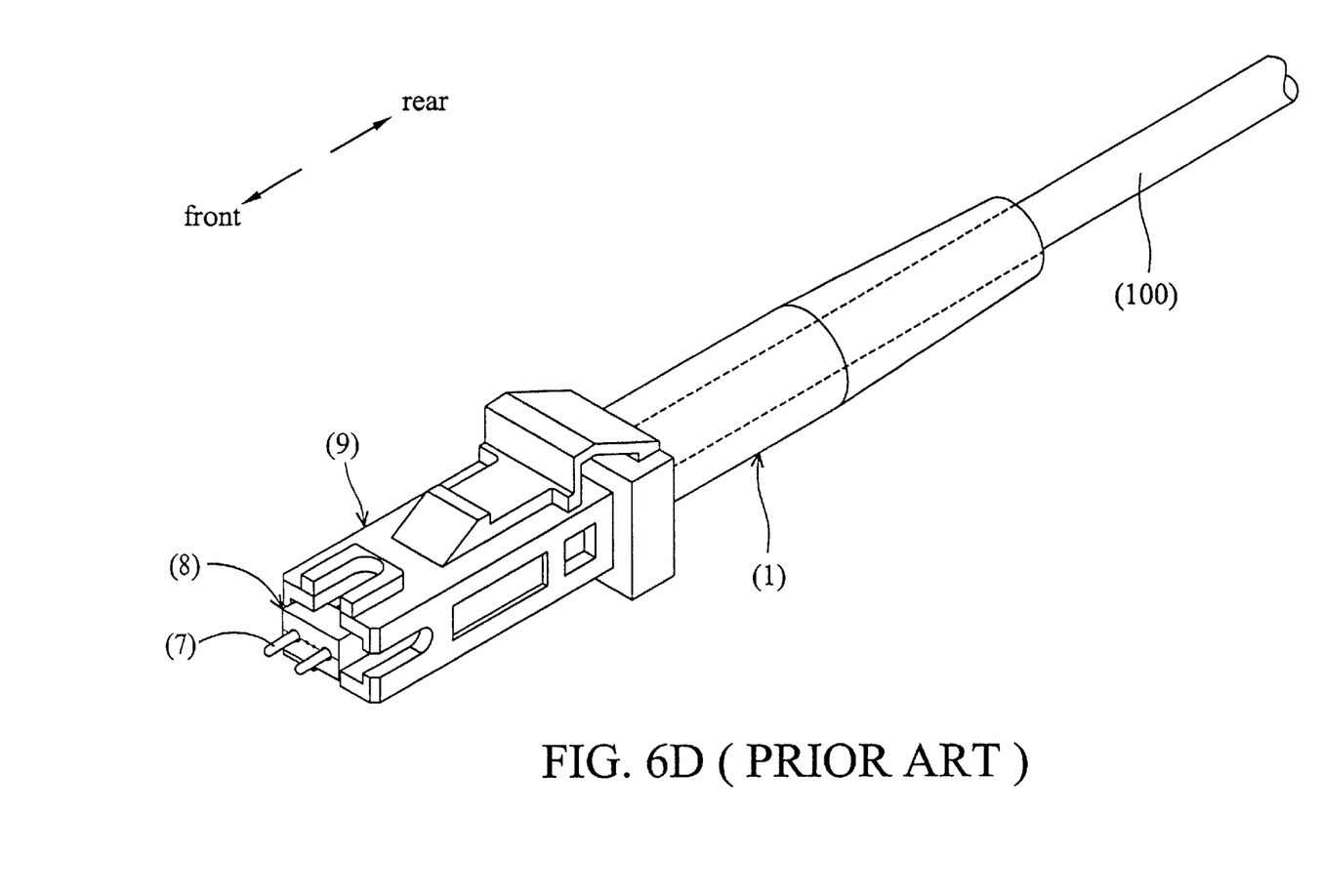

(Step 6) The ferrule (8) is put in the housing (9). Then, the spring push (3) is pushed forward so that the engaging portions (31) of the spring push (3) enter the holes (91) of the housing (9). Thus, the spring push (3) and the housing (9) are fixed together. Then, the sleeve (2) is pushed forward to cover the rear end (33) of the spring push (3) so that the celvars (120) are held between the sleeve (2) and the rear end (33) of the spring push (3). Generally, the celvars (120) are too long to be entirely covered by the sleeve (2). The exposed portion of celvars (120) is cut away. Then, the boot (1) is pushed to cover the sleeve (2) as shown in FIG. 6D, to finish the process of assembling the MT-RJ optical fiber connector.

Conventional MT-RJ optical fiber connectors have the following flaws:

The front end surface of the ferrule (8) is ground to remove the portions of the optical fibers protruding (Step 4). For a male connector, the pins (7) protrude from the front end surface of the ferrule (8) that obstructs the grinding operation. To solve the problem, the step of grinding the front end surface of ferrule (Step 4) precedes the step of assembling the pins (Step 5). However, each optical fiber is fragile. During the grinding operation, a section of the optical fiber (140) is protected only by the weak resin layer (130). The optical fiber is not strongly protected until the sleeve (2) is covered by the boot (1) (Step 6). Therefore, the workers need to carefully treat the optical fiber (140), preventing the optical fiber from breaking. This slows down the speed of assembling the connectors. Even so, optical fibers are broken from time to time, adversely affecting yield.

SUMMARY OF THE INVENTION

An object of the present invention is to provide an optical fiber connector that solves the above-mentioned problem.

The optical fiber connector of the present invention includes a housing, a ferrule, two pins, a ferrule boot, a pin holder, a spring, a spring push, a sleeve and a boot assembled in series. The ferrule defines two through holes, and the pin holder defines two mounting holes aligned with the through holes, allowing the pins to be inserted through the through holes into the mounting holes.

The boot, sleeve, spring push, spring, pin holder, ferrule boot and housing are assembled as a piece. Then, the ferrule of the piece is ground. The pins are then inserted into the piece. The process keeps the pins from obstructing the grinding operation. As well, most parts are assembled before the grinding operation, to protect the optical fibers. This allows workers to handle the optical fibers, speeds the process and promotes yield.

BRIEF DESCRIPTION OF THE DRAWINGS

The present invention can be more fully understood by reading the subsequent detailed description and examples with references made to the accompanying drawings, wherein.

DETAILED DESCRIPTION OF THE PREFERRED EMBODIMENT

Figure 7:
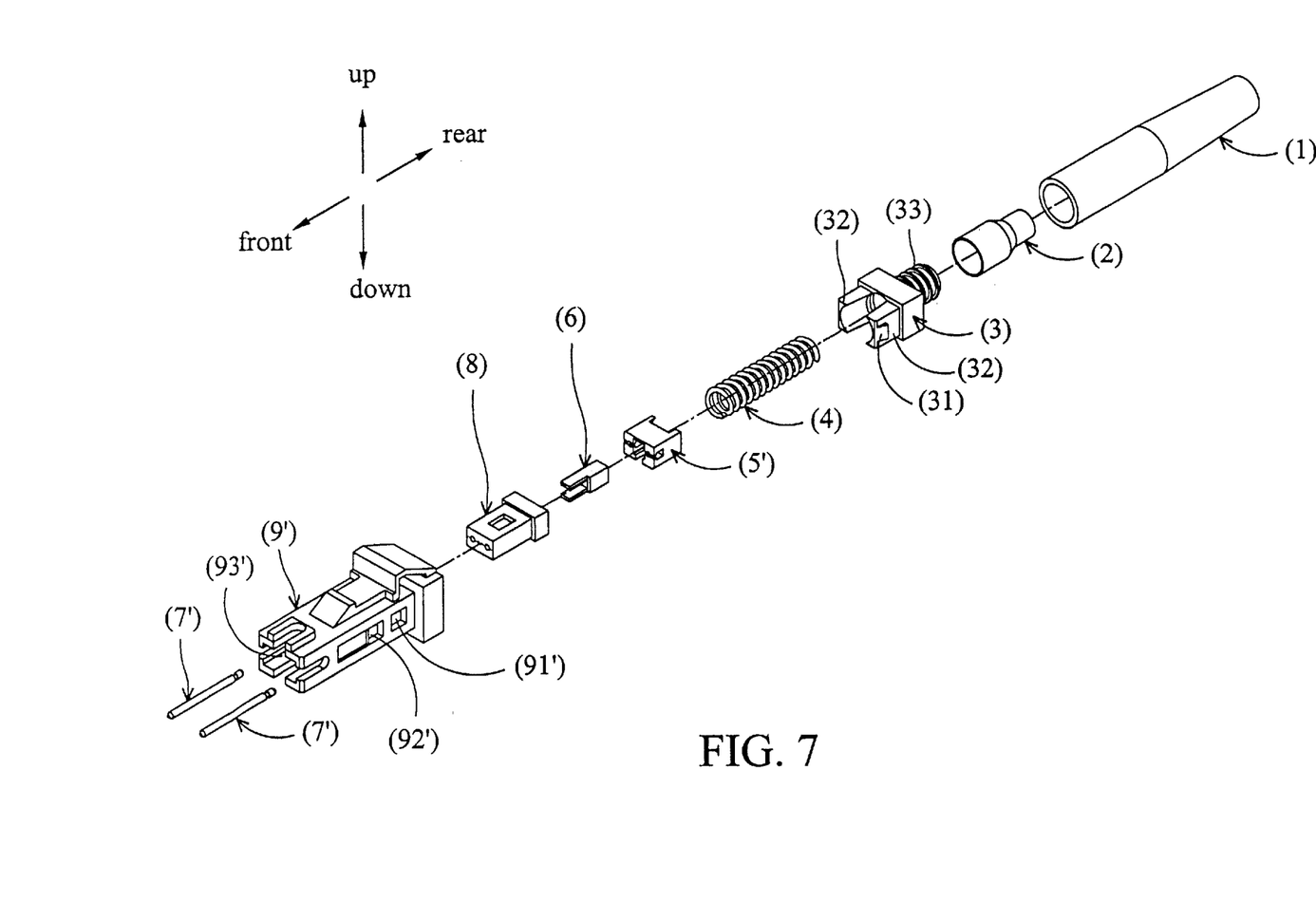
FIG. 7 is a perspective diagram of a MT-RJ optical fiber connector in accordance with the present invention.

Referring to FIG. 7, a MT-RJ optical fiber connector of the present invention has a boot (1), a sleeve (2), a spring push (3), a spring (4), a pin holder (5'), a ferrule boot (6), two pins (7') (only for the male connector), a ferrule (8) and a housing (9'). The above parts, the same as those of the conventional connector, are given the same reference numerals and the description thereof is omitted. Other parts including the pin holder (5'), the pins (7') and the housing (9'), different from those of the conventional connector, are introduced as follows:

The housing (9') is hollow and is the outmost part of the MT-RJ optical fiber connector. The housing (9') defines an opening (93') at its front end, two first holes (91') and second holes (92') on its both sides.

Figure 8:
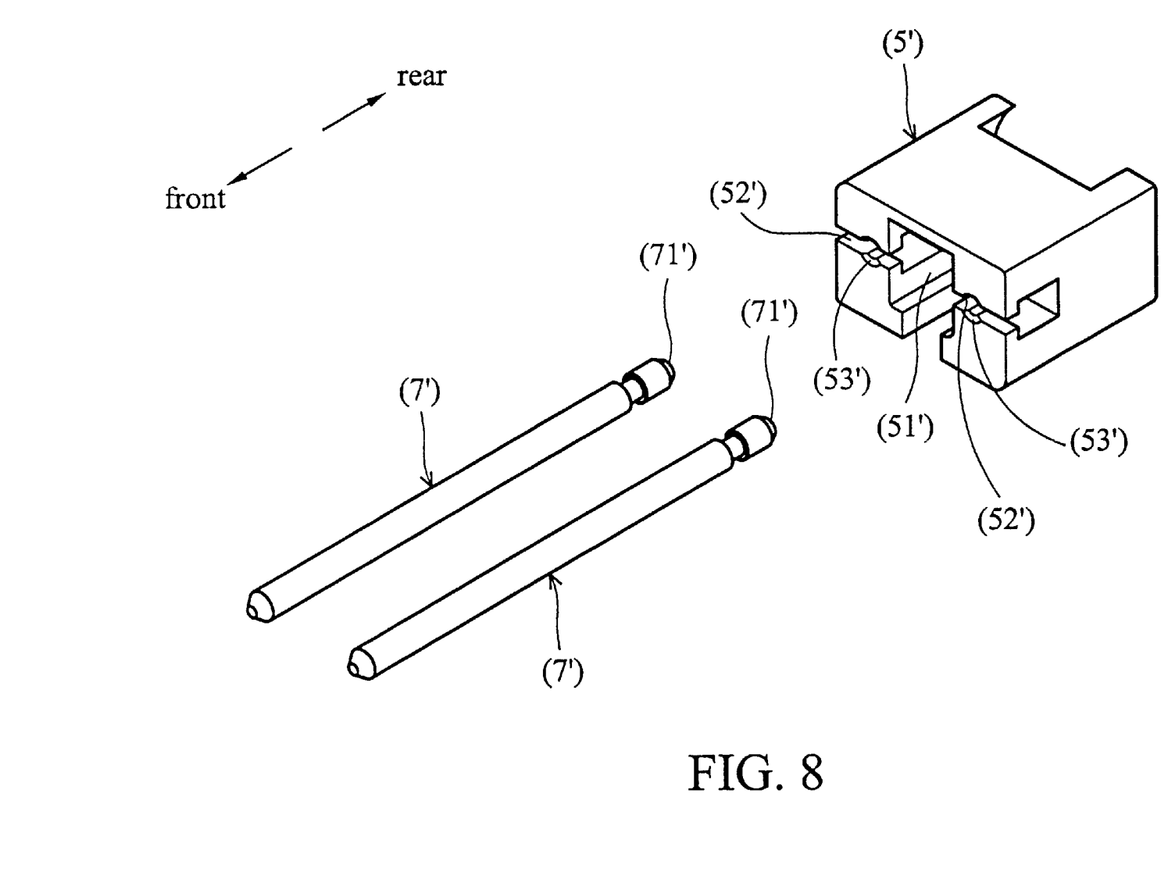
FIG. 8 depicts two pins and a pin holder of the MT-RJ optical fiber connector in accordance with the present invention.

Referring to FIG. 8, the pin holder (5') has a recess (51') on its bottom so that the pin holder (5') can sit on the ferrule boot (6) with the recess (51') containing the ferrule boot (6).

The pin holder (5) defines two mounting holes (52') on its front end for receiving the pins (7'). The entry to each mounting hole (52') is beveled. Reference numerals (53') indicate the bevel edges which facilitate the insertion of the pins (7') into the mounting holes (52'). The rear ends of the pins (7') are also beveled, indicated by reference numerals (71').

Figure 9A:
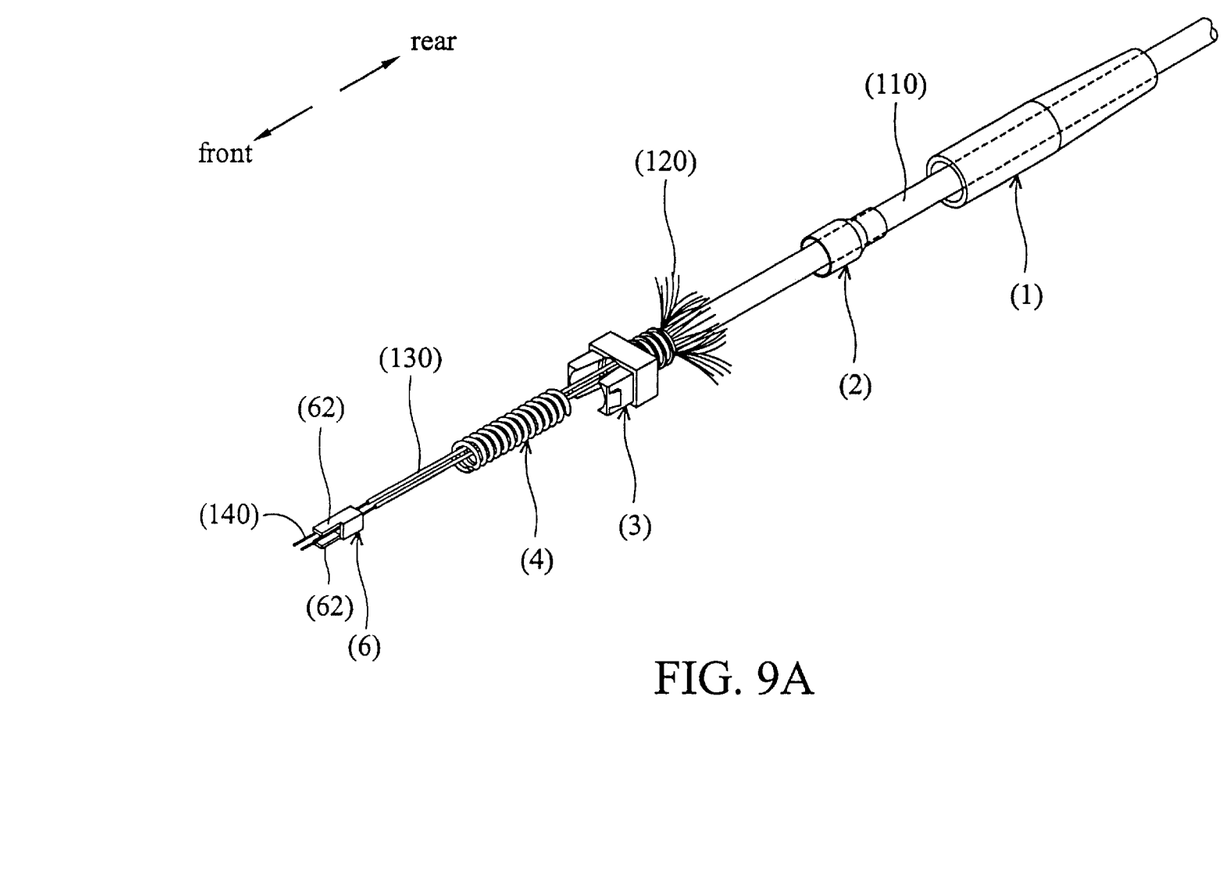
FIGS. 9A, 9B, 9C, 9D, 9E and 9F depict the process of assembling a MT-RJ optical fiber connector of the present invention.

A MT-RJ optical fiber connector of the present invention and an optical fiber cable are assembled in accordance with the following process:

(Step 1) Referring to FIG. 9A, the boot (1) and the sleeve (2) are put around the plastic cover (110) of the optical fiber cable (100), without being fixed. An end of the optical fiber cable (100) is stripped to expose the celvars (120), resin layers (130) and optical fibers (140). Then, the spring push (3) and the spring (4) are put around the resin layers (130). Then, the spring push (3) is pushed backward to cover the plastic cover (110), with the celvars (120) held between the spring push (3) 25 and the plastic cover (110). Thus, the spring push (3) is temporarily fixed to the optical fiber cable. Then, the optical fibers (140) are led through the through holes (61) of the ferrule boot (6), extending between the cantilevers (62).

Figure 9B:
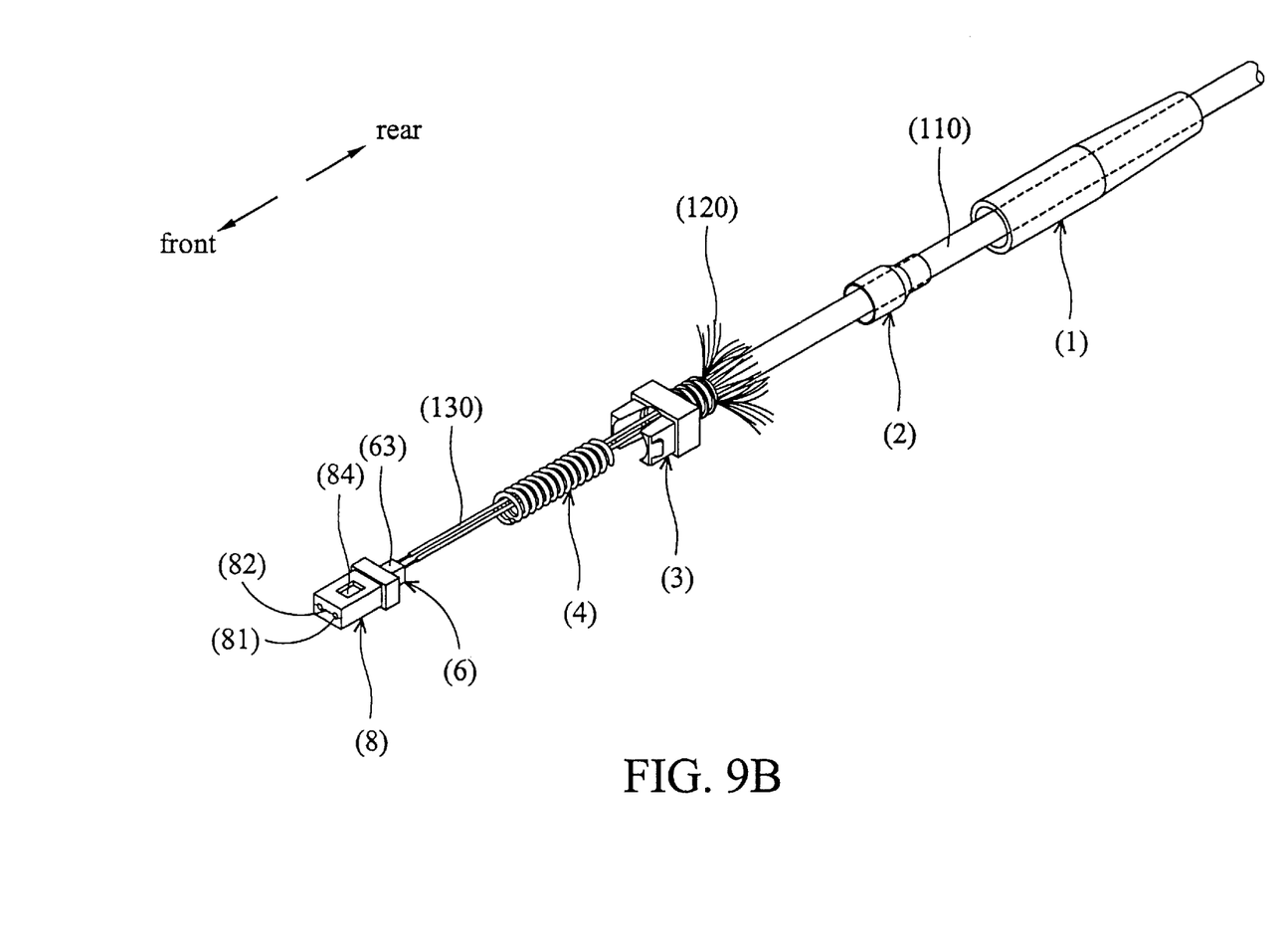

(Step 2) As shown in FIG. 9B, the cantilevers (62) of the ferrule boot (6) are inserted, toward the front, into the tunnel (83) of the ferrule (8), with the optical fibers (140) further into the fiber holes (82) communicating the tunnel (83). The optical fibers (140) protrude from the front end surface of the ferrule (8).

(Step 3) AB glue is applied to the inside of the ferrule (8) through the window (84). Then, the ferrule (8) is baked so that the AB glue is solidified to fix the optical fibers in the ferrule (8).

Figure 9C:
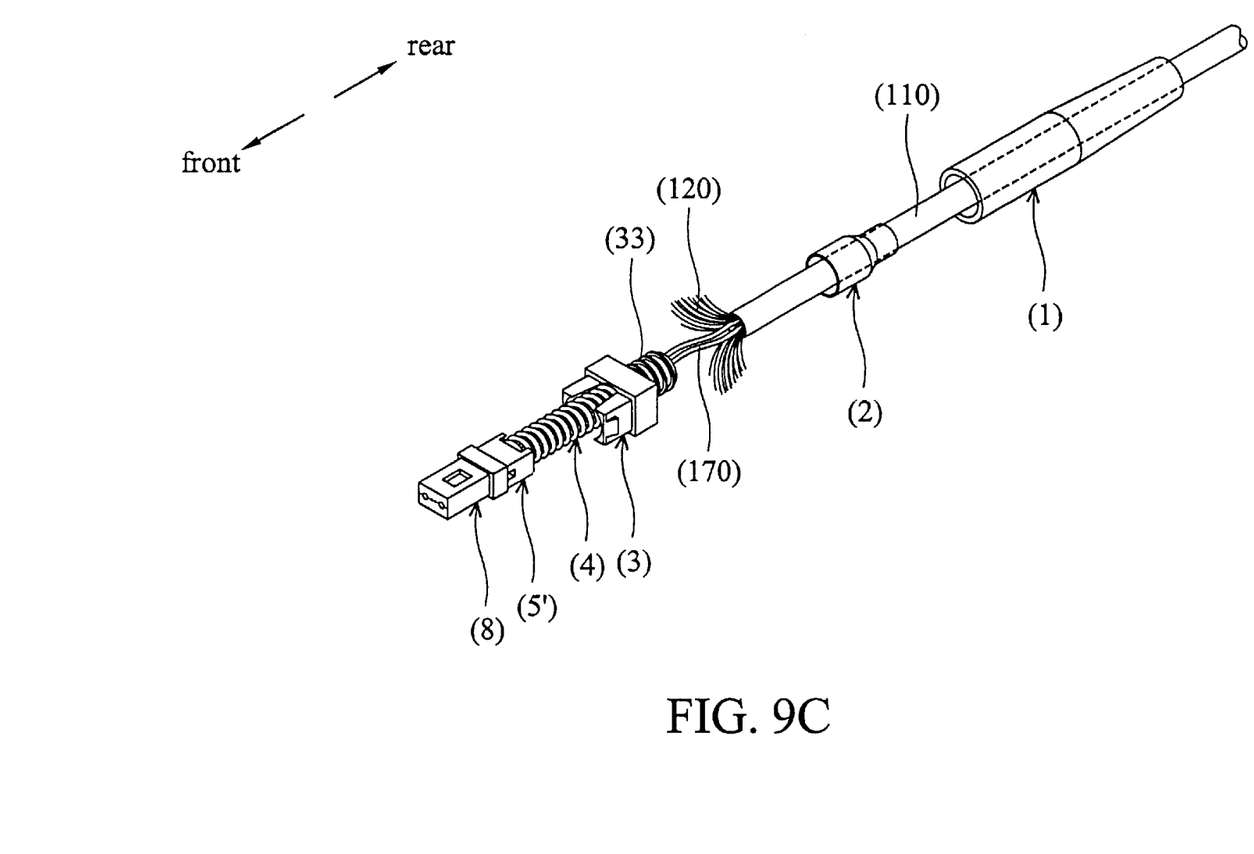

(Step 4) The pin holder (5') is mounted (sits) on the body (63) of the ferrule boot (6), with the spring (4) against the pin holder (5') and the spring push (3), as shown in FIG. 9C.

(Step 5) The ferrule (8) is put in the housing (9'). Then, the spring push (3) is pushed forward so that the engaging portions (31) of the spring push (3) enter the first holes (91') of the housing (9'). Thus, the spring push (3) and the housing (9') are fixed together. Then, the sleeve (2) is pushed forward to cover the rear end (33) of the spring push (3) so that the celvars (120) are held between the sleeve (2) and the rear end (33) of the spring push (3). Generally, the celvars (120) are too long to be entirely covered by the sleeve (2). The exposed portion of celvars (120) is cut away. Then, the boot (1) is pushed to cover the sleeve (2) as a pre-assembled piece as shown in FIG. 9D.

(Step 6) The front end surface of the ferrule (8) is ground to remove the portions of the optical fibers protruding therefrom.

Figure 9D:
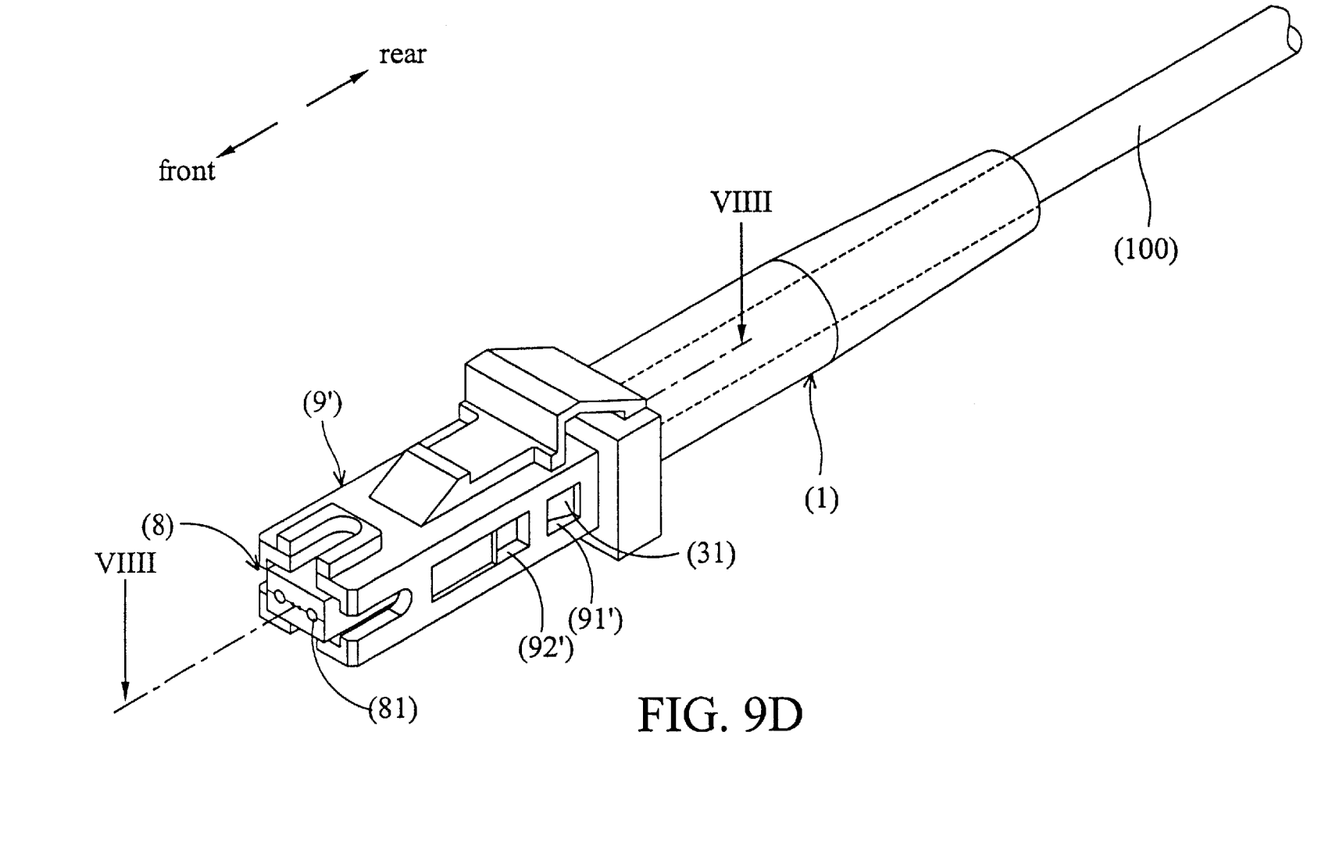
Figure 9E:
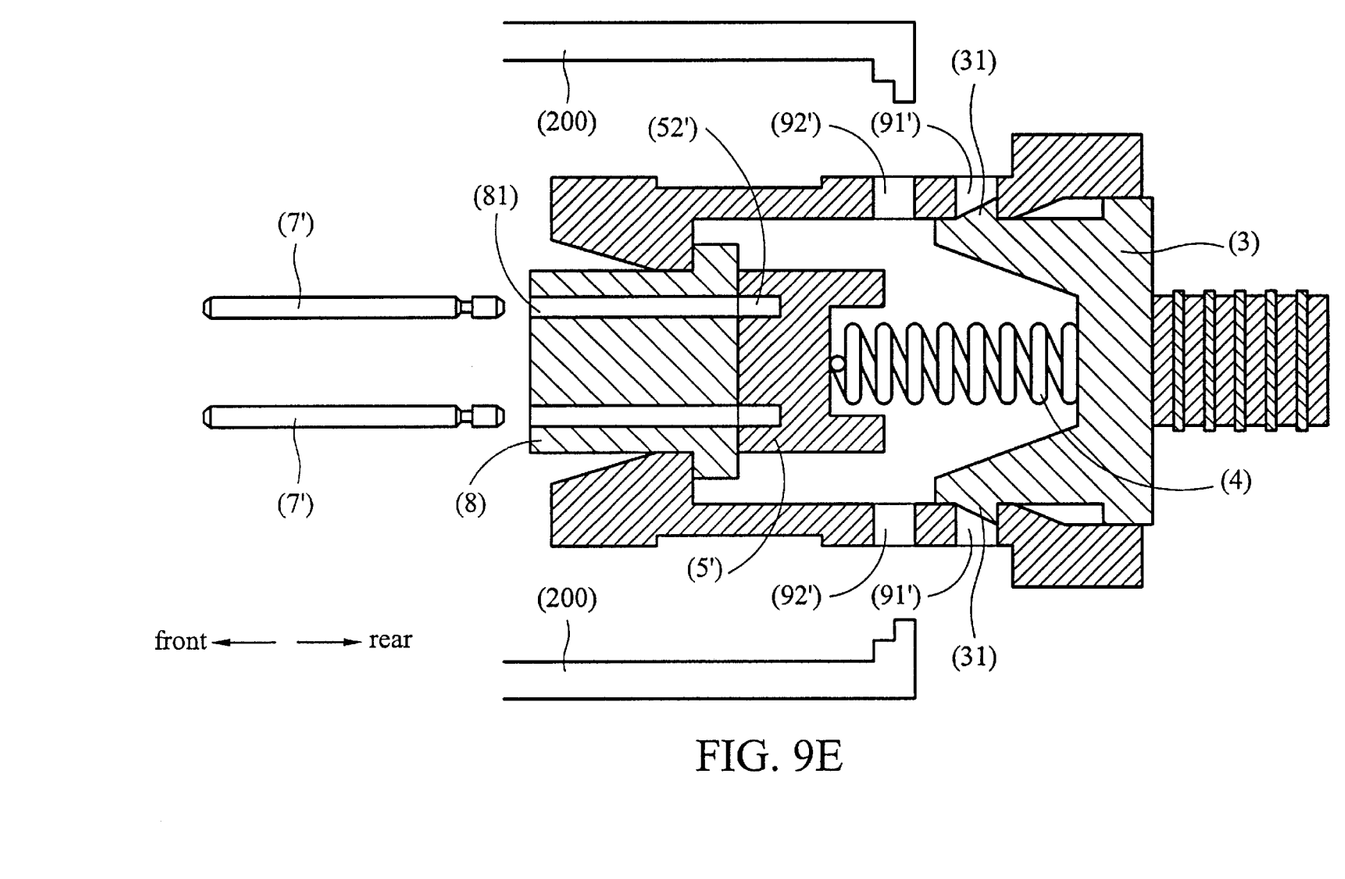
Figure 9F:
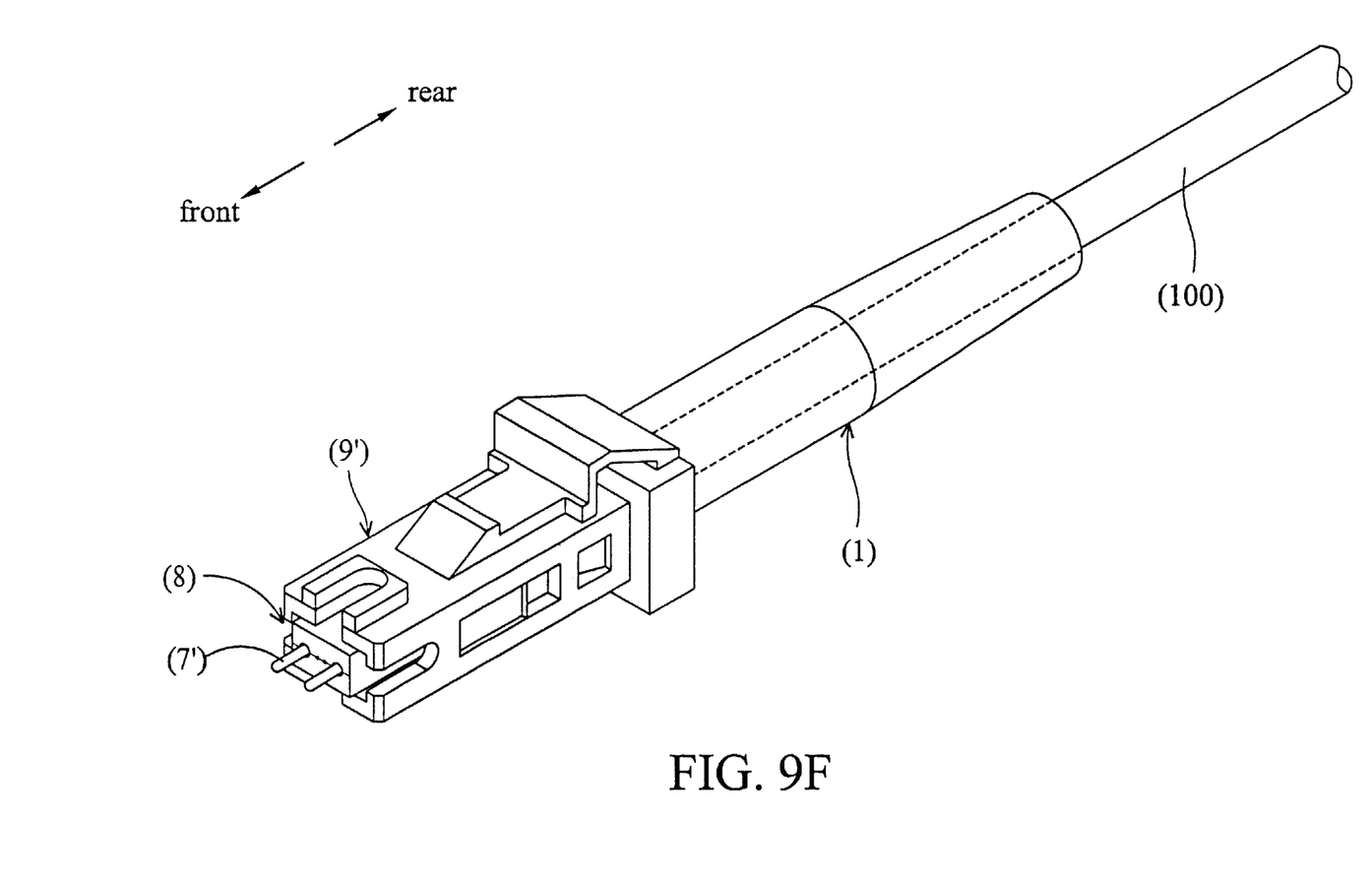

(Step 7) Referring FIG. 9E, a sectional view along line VIIII—VIIII of FIG. 9D, a jig (200) is moved into the housing (9') through the second holes (92') to hold the pin holder (5') at the middle of the housing, thereby the mounting holes (52') of the pin holder (5') are aligned with the through holes (81) of the ferrule (8). Then, the rear ends of the pins (7') are fitted into the through holes (81) of the ferrule (8) and further into the mounting holes (52') of the pin holder (5'). The jig (200) holds the pin holder (5'), preventing the pin holder (5') from backing. Then, the jig (200) is removed to finish the process of assembling the MT-RJ optical fiber connector.

As mentioned above, the boot (1), sleeve (2), spring push (3), spring (4), pin holder (5'), ferrule boot (6), pins (7') and housing (9') are assembled (Steps 1–5) before the grinding operation (Step 6), and the pins (7') are assembled at the last step (Step 7). Therefore the pins do not obstruct the grinding operation. Besides, most parts (1) (2) (3) (4) (5') (6) (8) (9') are assembled before the grinding operation, to protect the optical fibers. This allows workers to handle the optical fibers, speeds the process and promotes the yield.

Furthermore, it is understood that the jig (200) is required if the spring (4) is too flexible to prevent the pin holder (5') from backing (Step 7). On the other hand, the jig (200) is not required if the spring (4) is stiff enough. In such a situation, the second holes (92') of the housing (9') are not required, either.

While the invention has been described by way of example and in terms of the preferred embodiment, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An optical fiber connector for use with a ferrule connected to a housing comprising:

a pin holder having two mounting holes aligned with two holes of the ferrule, wherein two pins are inserted through the holes of the ferrule and into the mounting holes of the pin holder subsequent to the pin holder being connected to the ferrule, wherein the housing has at least one hole for receiving a jig, the jig removably engaging and positioning the pin holder relative to the ferrule as the pins are inserted.

2. The optical fiber connector for use with a ferrule connected to a housing according to claim 1 wherein each of the two mounting holes has a beveled entrance.

3. The optical fiber connector for use with a ferrule connected to a housing according to claim 1 wherein each of the two pins has a beveled end.

* * * * *